(12) United States Patent
Miller

(10) Patent No.: US 9,995,635 B2
(45) Date of Patent: Jun. 12, 2018

(54) THERMAL ELEMENT

(71) Applicant: DEKEMA DENTAL-KERAMIKOFEN GMBH, Freilassing (DE)

(72) Inventor: Stephan Miller, Traunstein (DE)

(73) Assignee: DEKEMA DENTAL-KERAMIKOFEN GMBH, Freilassing (DE)

( * ) Notice: Subject to any disclaimer, the term of this patent is extended or adjusted under 35 U.S.C. 154(b) by 242 days.

(21) Appl. No.: 14/760,577

(22) PCT Filed: Jan. 15, 2014

(86) PCT No.: PCT/EP2014/050692
§ 371 (c)(1),
(2) Date: Jul. 13, 2015

(87) PCT Pub. No.: WO2014/114536
PCT Pub. Date: Jul. 31, 2014

(65) Prior Publication Data
US 2016/0033338 A1 Feb. 4, 2016

(30) Foreign Application Priority Data
Jan. 24, 2013 (DE) .................. 10 2013 201 179

(51) Int. Cl.
*G01K 7/12* (2006.01)
*G01K 7/00* (2006.01)
(Continued)

(52) U.S. Cl.
CPC ............. *G01K 7/00* (2013.01); *G01K 1/08* (2013.01); *G01K 1/10* (2013.01); *G01K 7/02* (2013.01)

(58) Field of Classification Search
CPC combination set(s) only.
See application file for complete search history.

(56) References Cited

U.S. PATENT DOCUMENTS

| 2,483,350 A | 9/1949 | Polye et al. |
| 3,845,706 A * | 11/1974 | Strimple ................. G01K 7/04 136/230 |

(Continued)

FOREIGN PATENT DOCUMENTS

| DE | 3719760 A1 | 12/1988 |
| DE | 19945282 A1 | 4/2000 |

(Continued)

OTHER PUBLICATIONS

International Preliminary Report on Patentability for International application No. PCT/EP2014/050692 dated Jul. 28, 2015.

*Primary Examiner* — Lisa Caputo
*Assistant Examiner* — Nasir U Ahmed
(74) *Attorney, Agent, or Firm* — Cantor Colburn LLP

(57) ABSTRACT

The invention relates to a thermal element comprising a shaft and a test prod arranged on one end of the shaft. The thermal element comprises a first conductor and a second conductor, which are manufactured from different conductor materials and which are in electrical contact on one contact point provided in the region of the test prod. The first conductor and the second conductor are embedded at least in sections in a material of the shaft. The contact point is additionally or alternatively to the shaft material shielded with respect to the outside space at least in sections by means of a shield formed by a shielding material, wherein the shielding material has a lower diffusion coefficient and/or a higher thermal conductivity than the shaft material.

19 Claims, 4 Drawing Sheets

Figure 1:
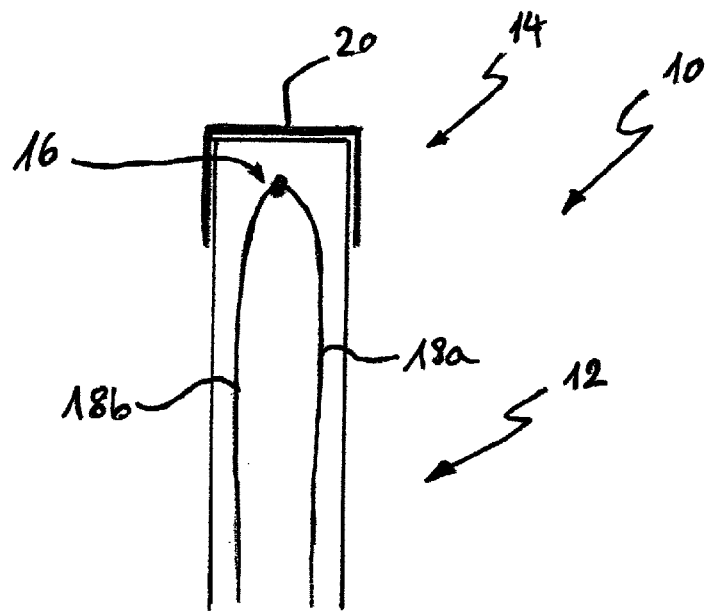

(51) Int. Cl.
   *G01K 1/10*    (2006.01)
   *G01K 7/02*    (2006.01)
   *G01K 1/08*    (2006.01)

(56) References Cited

U.S. PATENT DOCUMENTS

| | | |
|---|---|---|
| 4,724,428 A | 2/1988 | Brown, Jr. |
| 5,951,165 A * | 9/1999 | Platt ..................... G01K 1/08 |
| | | 136/230 |
| 2011/0222582 A1* | 9/2011 | Subramanian ........ F01D 17/085 |
| | | 374/179 |

FOREIGN PATENT DOCUMENTS

| | | |
|---|---|---|
| EP | 0045535 A2 | 2/1982 |
| EP | 0252692 A2 | 1/1988 |
| EP | 0857956 A1 | 8/1998 |
| FR | 2590980 A1 | 6/1987 |
| WO | 2009/055944 A1 | 5/2009 |

* cited by examiner

THERMAL ELEMENT

CROSS-REFERENCES TO RELATED APPLICATIONS

This application is a National Phase Application of Patent Application PCT/EP2014/050692, filed on Jan. 15, 2014, which claims the priority of German Application No. 102013201179.2 filed on Jan. 24, 2013, which is incorporated herein by reference, in its entirety.

The present invention relates to a thermal element for temperature measurement.

The functional principle of such thermal elements is generally known. Expressed in a simplified manner thermal elements comprise two conductors of different materials that are in electrically conductive contact with one another at a measurement probe. At the ends of the conductor remote from the measurement probe a voltage can be tapped, the voltage being a measure for a temperature difference between the measurement probe and a comparative measurement point—that is typically integrated into the thermal elements. The selection of the used conductor materials, amongst other things, depends on the temperature range at which the respective thermal elements should be used.

Thermal elements are—like many other sensors also—subjected to aging processes that can have impacts on the temperature dependencies of the temperature determination of the thermal voltage to be measured. Such aging processes in particular play a role having regard to thermal elements that are used for high temperatures. They can lead thereto that the measured temperature significantly deviates from the actually present temperature.

In many fields an age-related change of the characteristics of a thermal element is very problematic. For example, the exact maintenance of predefined temperature profiles is of large importance having regard to firing processes of dental products in corresponding furnaces in order to ensure a high quality of the article to be fired.

Thermal elements are generally embedded into a shaft that surrounds the conductor in a protective manner. Having regard to high temperature thermal elements, for example, aluminum oxide is used as a shaft material. Frequently, also a high temperature adhesive is additionally used.

At high temperatures, materials that, are for example present as ions, diffuse through the shaft material to the conductors and change their properties and/or negatively influence these. The materials can stem from the environment of the thermal element or from the shaft material itself. In other words, the conductors are continuously negatively influenced by the materials diffusing through the shaft material which is why their properties change in a time-dependent manner. This in turn leads to a creeping deterioration of the measurement accuracy of the thermal element, which means that the thermal element "drifts" respectively ages. Moreover, it was observed that the previously described aging processes can also disadvantageously effect the response dynamics of the thermal elements.

For this reason it is an object of the present invention to create a thermal element that is less susceptible to aging processes and for this reason continuously delivers reliable temperature values. Furthermore, the thermal element should be able to quickly recognize temperature changes.

This object is satisfied by a thermal element having the features of claim 1.

The thermal element in accordance with the invention comprises a shaft and a measurement probe arranged at an end of the shaft. The thermal element further comprises a first conductor and a second conductor that are manufactured from different conductor materials and that are in electric contact with one another at a contact point provided in a region of the measurement probe, wherein the first conductor and the second conductor are at least regionally embedded into a material of the shaft. The contact point is screened at least regionally by a screen formed from a screen material in addition to or as an alternative of the shaft material with respect to an outer space. The screen material has a lower coefficient of diffusion and/or a higher thermal conductivity than the shaft material.

The shaft can be manufactured from a single material. However, it is generally also possible to form the shaft from a plurality of materials. For example a tubular sleeve can be provided into which a second material is introduced. For example, the sleeve is an aluminum oxide tube that is, for example, partly filled with a high temperature adhesive.

The term "embedded" is to be understood such that the two conductors are guided through the interior of the shaft. This can mean that the two conductors extend in separate bores and are only guided together in the region of the contact point. However, it is also possible to "mold" the two conductors—for example with the aid of a high temperature adhesive—such that the two conductors are substantially completely surrounded by the shaft material.

In other words the two conductors form the basic components of the thermal elements. They are electrically conductively connected at the contact point in such a way that a temperature dependent voltage—a so called thermal voltage—can be formed for a temperature difference between the contact point and a comparative measurement point. For reasons of protection, the two conductors at least regionally extend in the shaft. In order to protect the contact point particularly sensitive for aging processes this is additionally protected by a screen with respect to the outer space. The screen comprises a material that acts as a diffusion inhibitor, this means the material has a lower coefficient of diffusion for at least some of the materials responsible for the aging processes than the shaft material. Additionally or alternatively, the screen can also be composed of a material that has an improved thermal conductivity than the shaft material in order to improve the response dynamics of the thermal element and to homogenize the temperature distribution in the region of the measurement probe. Advantageously the screen is both a diffusion inhibitor and also more thermally conductive than the shaft material.

Further embodiments of the invention are provided in the description, the claims and the figures.

In accordance with an advantageous embodiment the contact point is not in contact with the shaft material. In other words the contact point is arranged outside of the shaft material. Materials diffusing from the material of the shaft and/or through the material of the shaft, and in particular stemming from the material of shaft, are thus not directly at the particularly corrosion sensitive contact point.

The contact point is in particular arranged in a recess of the shaft. The recess is, for example, formed by a chamber whose sidewalls are at least partly formed by the shaft material.

In accordance with an embodiment the recess is a slot which in particular extends in parallel with or transverse to a longitudinal axis of the shaft. The recess can also be a bore which is in particular arranged coaxial with or transverse to the longitudinal axis of the shaft.

It can be provided that the screen forms a cover or a cap that terminates the recess with respect to the outer space. The screen can also be formed band-like.

The internal space of the recess, in which the contact point is arranged, is not in contact with the outer space having regard to this embodiment. The internal space can, however, be filled with gas in order to enable a convective heat conductance.

A particularly efficient screening effect is achieved when the screen completely surrounds or covers the outer side of the measurement probe. Additionally or alternatively it is possible that the contact point is in electrically conductive contact with the screen.

It can be provided that the contact point is in thermally conductive contact with the screen in order to increase the response dynamics of the thermal element by means of an improved thermal conductivity.

In accordance with an embodiment the screen material is metallic. The screen material can, for example, comprise one of the two conductor materials or a mixture of both of the conductor materials. In particular one of the conductor materials and/or the screen material comprise platinum.

The shaft material can comprise aluminum oxide and/or a high temperature adhesive.

The invention further relates to a method of manufacturing a thermal element that has an improved aging consistency and response dynamics. In particular it is in this connection a thermal element in accordance with one of the previously described embodiments. The thermal element comprises a shaft and a measurement probe arranged at an end of the shaft, wherein the thermal element comprises a first conductor and a second conductor that are manufactured from different conductor materials and that are in electric contact with one another in a region of the measurement probe. The first conductor and the second conductor are at least regionally embedded into a material of the shaft, wherein the contact point is screened at least regionally by a screen formed from a screen material in addition to or as an alternative of the shaft material with respect to an outer space. The screen material has a lower coefficient of diffusion and a higher thermal conductivity than the shaft material.

In accordance with the invention a common molding compound is formed from end sections of the two conductors—for example by mechanical forming—for the manufacture of the contact point, with the molding compound comprising the contact point and at least a part of the screen is in turn formed from the contact point. Preferably the two conductors—respectively their end sections—are melted at least partly together for the manufacture of the contact point while forming a melt bead. At least a part of the screen is then formed from the formed melt bead. Generally, it is also possible to melt the conductors initially separately at their end sides and to then combine the thereby generated melt beads in order to form a common melt bead.

It can alternatively be provided that the first conductor and the second conductor or the contact point at the screen are fastened to the screen in a thermally conductive manner, in particular by welding. In this connection also an electric contact can be simultaneously produced between the conductors and/or the contact point and the screen.

In the following, the invention will be described purely by way of example with reference to advantageous embodiments and by means of the submitted drawings. There is shown:

FIGS. 1 to 8 different embodiments of the thermal element in accordance with the invention.

FIG. 1 shows a thermal element 10 having a shaft 12 and having a measurement probe 14 that is arranged at a free end of the thermal element 10 and that comprises a contact point 16 through that a contact between two electric conductors 18a, 18b is formed. The conductors 18a, 18b are composed of different metallic materials in such a way that a thermal voltage can arise that is a measure for a temperature present in a region of the measurement probe 14. Widely used pairs of materials are nickel-chrome/nickel, iron-copper/nickel and platinum-rhodium/platinum. The final pair of materials is in particular suitable for high temperature regions. Having regard to particularly high temperatures also iridium-iridium/rhodium and tungsten-5%-rhenium/tungsten-25%-rhenium conductor pairs are used. For the measurement of very low temperatures, amongst other things, also gold/iron-nickel/chromium and gold/iron-gold/silver-material pairs are used.

Having regard to the aging process described briefly in the introduction, materials diffuse to the conductors 18a, 18b that stem from the shaft 12 itself or from the outer space. In order to prevent the material stemming from the outer space, in particular from arriving at the contact point 16 decisive for the temperature measurement, a screening cap 20 is provided that covers the region around the measurement probe 14 in a large-area manner. Generally, materials stemming from the shaft 12 can indeed still arrive at the contact point 12; however, materials stemming from the outer space have to travel a significantly longer path in order to arrive at the contact point 16 than without the cap 20 which strongly delays the aging process of the thermal element 10.

The screening cap 20 is, for example, of platinum, as this material is characterized by a high temperature stability and a high corrosion resistance. Moreover, it is has a low coefficient of diffusion with regard to materials causing the aging processes than the shaft material that, for example, comprises aluminum oxide and/or high temperature adhesives. Moreover, it has an improved temperature conductivity in such a way that the temperature present in the measurement region can quickly and uniformly penetrate through the screening cap 20.

The screening cap 20 can be applied directly onto the measurement probe 14 or can initially be manufactured separately and then be fastened to the measurement probe 14. Having regard to the embodiment shown in FIG. 1 it is limited to the region of the measurement probe 14 around the contact point 16 for reasons of material saving. Despite this spatial limitation, a good screening effect is achieved by the screening cap 20.

Figure 2:
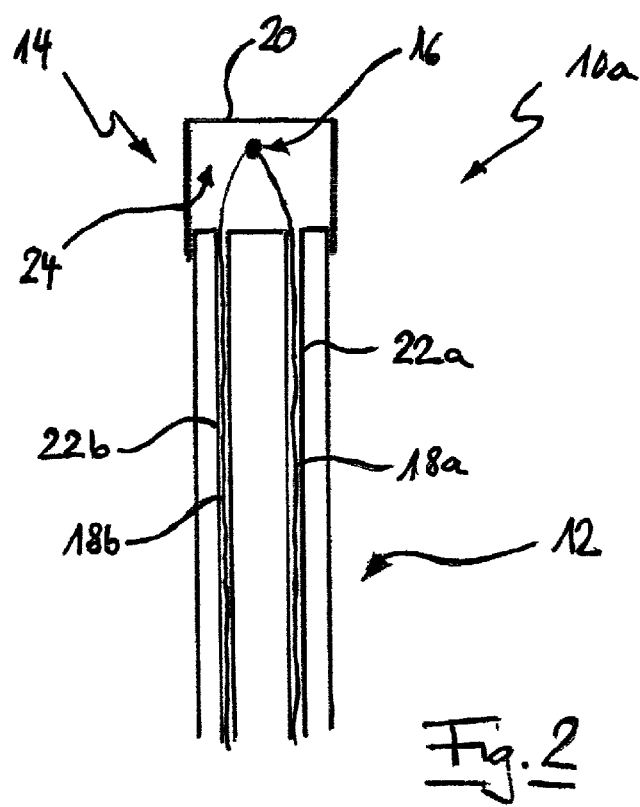

FIG. 2 shows a thermal element 10a in which the conductors 18a, 18b are guided through separate bores 22a and 22b through the shaft 12. The conductors 18a, 18b exit the material of the shaft 12 in the region of the measurement probe 14. The contact point 16 thus lies outside of the shaft 12. In order to mechanically protect the contact point 16 and/or to protect from materials present in the outer space, the screening cap 20 is provided which is fastened to the shaft 12. In other words the screening cap 20 creates a protective internal space 24 in which the contact point 16 is arranged. In order to also enable a convective heat conductance, the internal space 24 is filled with gas. The internal space 24 can, for example, be filled with air. However, it is also possible to introduce certain gases and/or gas mixtures (e.g. a protective gas and/or gas mixtures) into the internal space 24 that is respectively adapted to the present conditions. This measure is generally possible having regard to all embodiments of the thermal element in accordance with the invention that have an internal space separate from the outer space in which internal space the contact point 16 is arranged.

Deviating from the illustrated pot-shaped design of the screening cap 20 this can, for example, also be bell-shaped or have a parabola-shaped cross-section. The shaping of the screening cap 20 can be adapted freely to the respectively present conditions.

Figure 3:
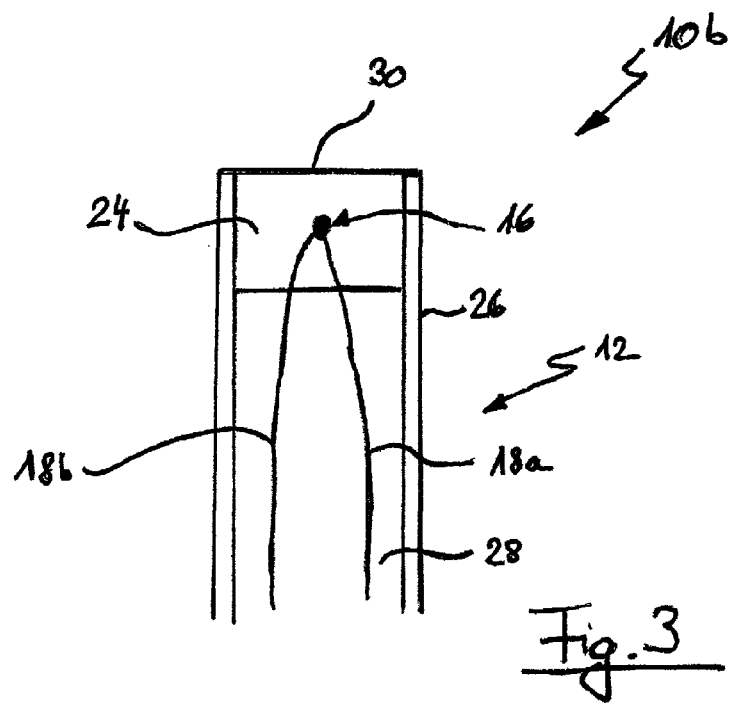

FIG. 3 shows a thermal element 10b whose shaft 12 comprises a tube—e.g. manufactured from aluminum oxide—into which the two conductors 18a, 18b are embedded separate from one another by means of a high temperature adhesive 28. The contact point 16 lies freely in the internal space 24, this means outside of the high temperature adhesive 28. In order to protect the contact point 16, the tube 26 is not completely filled with the high temperature adhesive such that the free end of the tube 26 projects slightly further into the outer space than the contact point 16. As an additional protective measure, a cover 30 is provided that terminates the internal space 24 defined by the free end of the tube 26. In particular the cover 30 is composed of the material of one of the two conductors 18a, 18b, for example of platinum. The cover 30 can however also be manufactured from an electrically non-conductive material, for example from sapphire glass.

Figure 4:
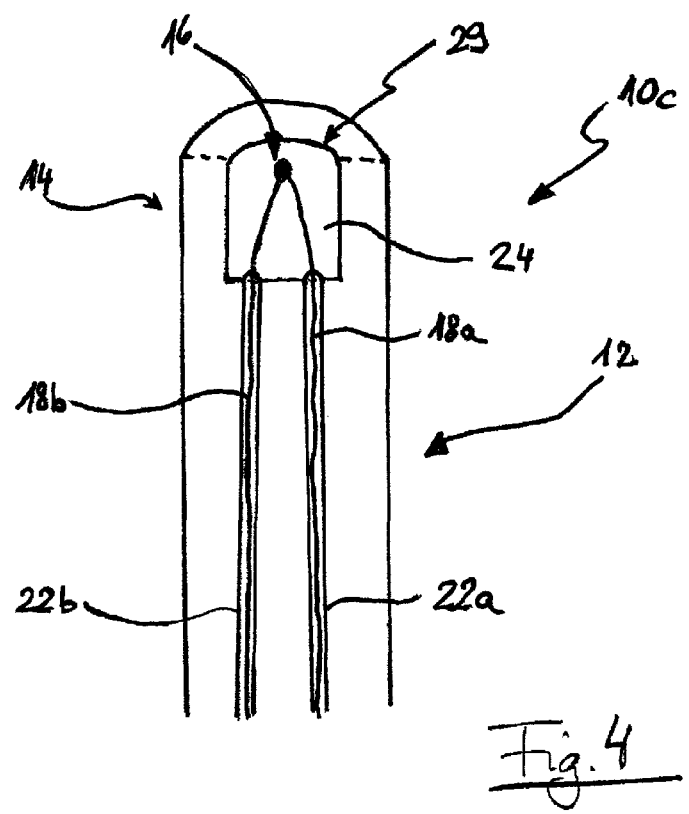

FIG. 4 shows a perspective sectional view of a thermal element 10c whose shaft 12 is formed from one piece. The conductors 18a, 18b extend—as with the thermal element 10a—through bores 22a, 22b. The internal space 24 protecting the contact point 16 is formed by a bore 29 that was introduced coaxially into the free end of the shaft 12. It can be recognized that the contact point 16 lies approximately at the height of the boundary bounding the bore 29. If one applies a cover, such as was, for example, described in connection with the thermal element 10b of FIG. 3, this comes into contact with the contact point 16, whereby the thermal conductivity between the outer space and the contact point 16 and in this way the response dynamics of the thermal elements 10c are improved.

Generally it can be provided that the contact point 16 is not mechanically fastened to the cover 30. In many fields of application it is, however, advantageous when the contact point 16 is fixedly connected to the cover 30, for example welded thereto. In this connection, for example a spot welding process can be used. However, it is also possible to weld the two conductors 18a, 18b to one another for the formation of the contact point 16. For this purpose end sections of the two conductors 18a, 18b are melted together—for example by a flame or a laser beam—in such a way that a melt bead is generated that in turn is used for the manufacture of the cover 30. This means that the melt bead is deformed for the termination of the internal space 24, for example is pressed "flatly". The common screen or only a part thereof can then be formed from the melt bead.

It is understood that the contacting of the contact point 16 with the cover 30 can take place in an analog manner having regard to the screening concept based on a screening cap 20. In particular the use of a melt bead for the formation of the screen—regardless of how this may specifically be designed—simplifies the manufacturing process of the thermal element in accordance with the invention.

Figure 5:
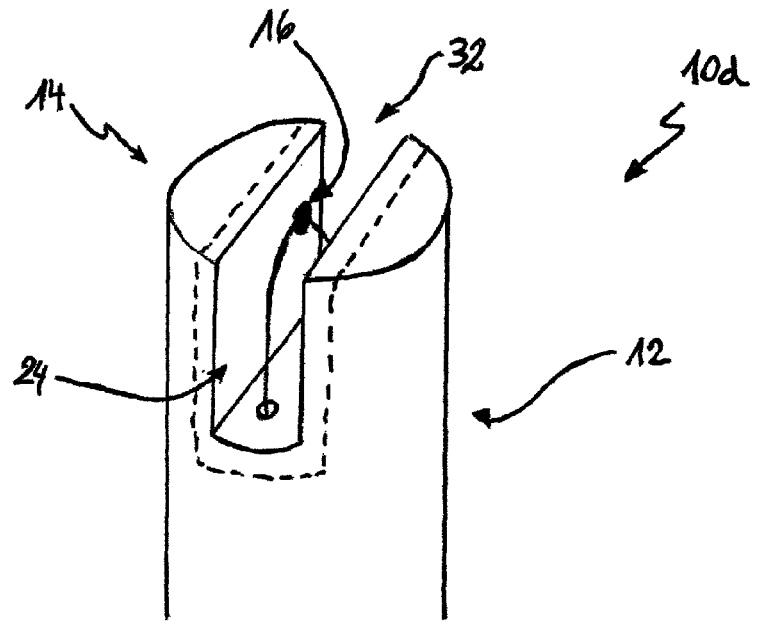

FIG. 5 shows a thermal element 10d that has a slot 32 lying in parallel with the longitudinal axis of the shaft 12 instead of the coaxial bore 29 for the formation of the internal space 24 shown in FIG. 4, the slot being cut or milled into the free end of the shaft 12. The slot 32 is dimensioned in such a way that it can receive the contact point 16. This means it can also be less deep than is, for example, shown in FIG. 5. The same is true for the design of the respective internal space 24 of the thermal elements 10a, 10b, 10c and the thermal elements 10e, 10f, 10g still to be described in the following.

The measurement probe 14 of the thermal element 10d can be provided with a screening cap 20 such as it was, for example, described with reference to the thermal elements 10, 10a. However, it is also possible to terminate the internal space 24 merely by a strip—indicated with dotted lines—with respect to the outer space in order to save material required for the screen.

Figure 6:
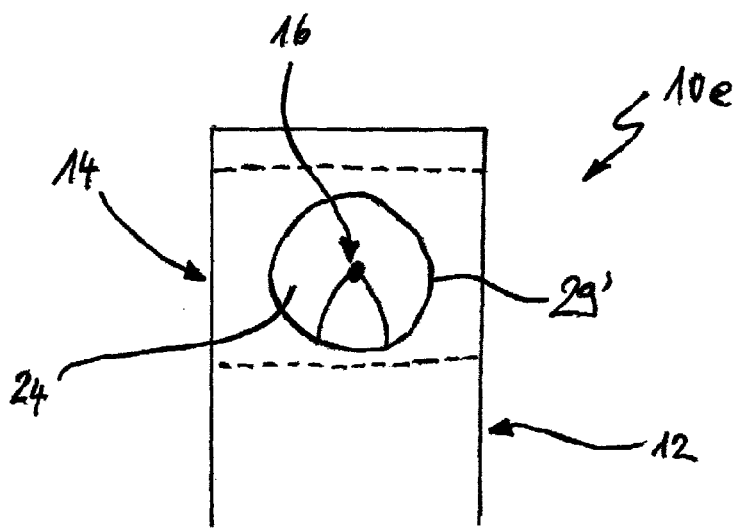

Generally, it is also possible to provide a bore 29' arranged perpendicular to the longitudinal axis of the shaft 12 instead of the coaxial bore 29 of the thermal element 10c of FIG. 4 in which bore 29' the contact point 16 is arranged as is emphasized with reference to the thermal element 10e of FIG. 6. The internal space 24 formed by the bore 29' can, for example, be terminated by a screening cap, a band at least partly running around the shaft 12 in the region of the bore 29' (indicated with dotted lines) or by two separate covers with respect to the outer space.

Figure 7:
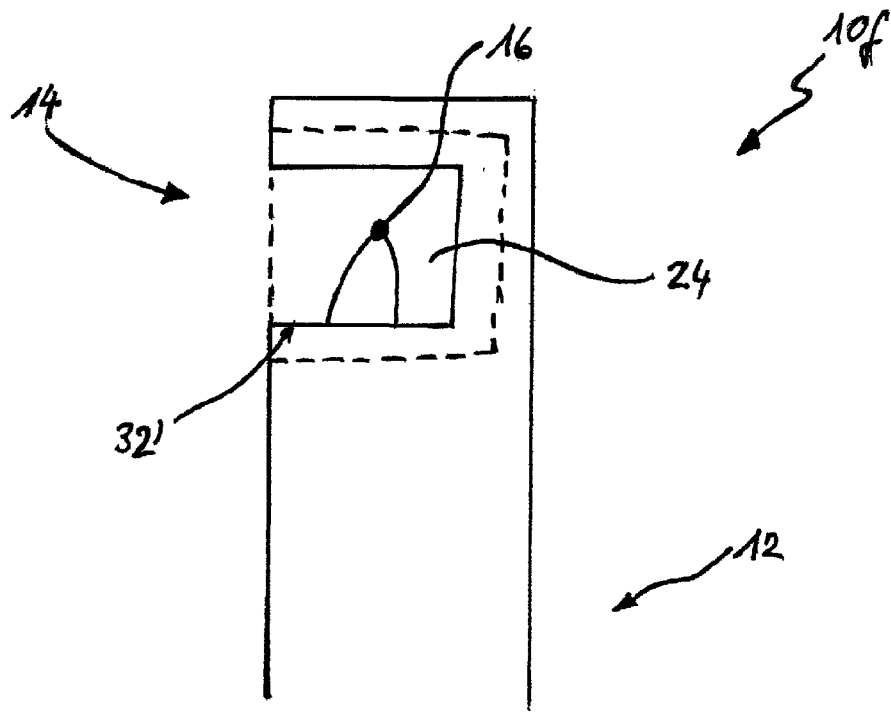

FIG. 7 shows a thermal element 10f that has a slot 32' aligned transverse to the longitudinal axis of the shaft 12 in contrast to the slot 32 shown in FIG. 5. The internal space 24 formed by the slot 22' can, for example, be terminated by a screening cap or a band (indicated with dotted lines) running at least partly around the shaft 12 with respect to the outer space.

Figure 8:
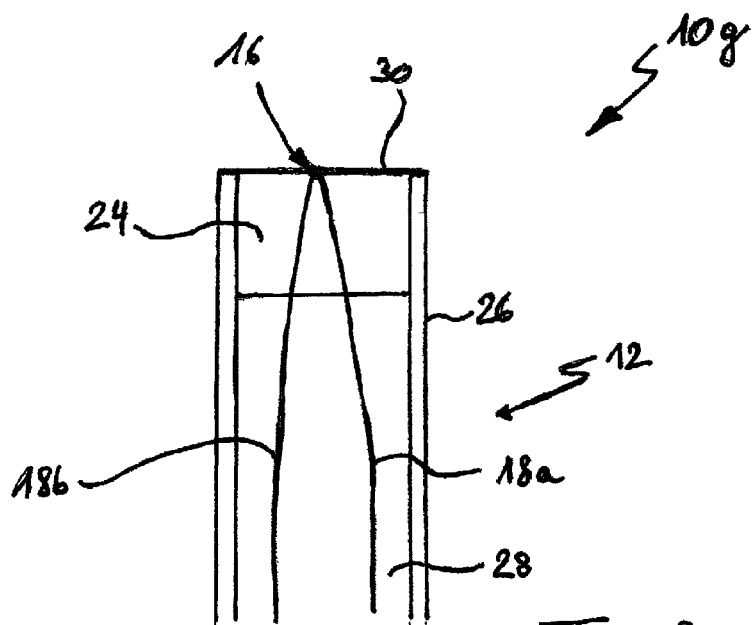

FIG. 8 shows a thermal element 10g whose shaft 12—like the thermal element 10b shown in FIG. 3—comprises a tube into which the two conductors 18a, 18b are embedded separate from one another by means of a high temperature adhesive 28. In contrast to the situation having regard to the thermal element 10b, the contact point 16 does, however, not lie freely in the internal space 24, but is integrated into the cover 30. Generally, this can be achieved in that a previously generated contact point is mechanically or thermally connected to the cover. Having regard to the thermal element 10g shown in FIG. 8, the free ends of the conductors 18a, 18b were joined in contrast thereto and are commonly melted. The thereby generated melt bead was subsequently deformed to the cover 30. This approach was already explained in connection with the thermal element 10c. Generally, it is also possible to melt the respective ends of the conductors 18a, 18b separately from one another and to combine the two resultant melt beads in order to form a common melt bead which is then deformed in a suitable manner.

The previously described embodiments 10, 10a, 10b, 10c, 10d, 10e, 10f, 10g of the thermal elements in accordance with the invention indeed at times have different designs of the shaft 12. However, it is understood that the different designs of the improved screening in the region of the contact point can generally be combined arbitrarily with different manners of shaft construction. The shaft can be shaped in accordance with the intended requirement, this means it can, for example, have curved and/or bent sections in order to reflect the respectively present situation of construction space.

LIST OF REFERENCE NUMERALS 10, 10a, 10b, 10c, 10d, 10e, 10f, 10g thermal element
12 shaft
14 measurement probe
16 contact point
18a, 18b conductors
20 screening cap
22a, 22b bore 24 internal space
26 tube
28 high temperature adhesive
30 cover
29, 29' bore
32, 32' slot

What is claimed is:

1. A thermal element having a shaft and having a measurement probe arranged at an end of the shaft, wherein the thermal element comprises a first conductor and a second conductor that are manufactured from different conductor materials and that are in electric contact with one another at a contact point provided in a region of the measurement probe, wherein the first conductor and the second conductor are at least regionally embedded into a material of the shaft and wherein the contact point is screened at least regionally by a screen formed from a screen material in addition to or as an alternative of the shaft material with respect to an outer space and wherein the screen material has a lower coefficient of diffusion and/or a higher thermal conductivity than the shaft material, the contact point and at least a part of the screen being formed from a common molding compound which is formed from end sections of the two conductors while melting the conductors to form the contact point.

2. The thermal element in accordance with claim 1, wherein the contact point is not in contact with the shaft material.

3. The thermal element in accordance with claim 2, wherein the contact point is arranged in a recess of the shaft.

4. The thermal element in accordance with claim 3, wherein the recess is a slot.

5. The thermal element in accordance with claim 4, wherein the slot extends in parallel with or transverse to a longitudinal axis of the shaft.

6. The thermal element in accordance with claim 3, wherein the recess is a bore.

7. The thermal element in accordance with claim 4, wherein the bore is arranged coaxial with or perpendicular to the longitudinal axis of the shaft.

8. The thermal element in accordance with claim 1, wherein the screen forms a cover or a cap that terminates the recess with respect to the outer space.

9. The thermal element in accordance with claim 1, wherein the screen substantially completely surrounds or covers the outer sides of the measurement probe.

10. The thermal element in accordance with claim 1, wherein the contact point is in thermally conductive and/or electrically conductive contact with the screen.

11. The thermal element in accordance with claim 1, wherein the screen material is metallic.

12. The thermal element in accordance with claim 1, wherein the screen material comprises one of the two conductor materials or a mixture of both of the conductor materials.

13. The thermal element in accordance with claim 1, wherein at least one of the conductor materials and/or the screen material comprises/comprise platinum.

14. The thermal element in accordance with claim 1, wherein the shaft material comprises aluminum oxide and/or a high temperature adhesive.

15. A method of manufacturing a thermal element, having a shaft and having a measurement probe arranged at an end of the shaft, the method comprising:
    forming the thermal element that comprises a first conductor and a second conductor that are manufactured from different conductor materials and that are in electric contact with one another at a contact point provided in a region of the measurement probe,
    embedding the first conductor and the second conductor at least regionally into a material of the shaft;
    screening the contact point at least regionally by a screen the screen is formed from a screen material in addition to or as an alternative of the shaft material with respect to an outer space, the screen material has a lower coefficient of diffusion and/or a higher thermal conductivity than the shaft material; and
    forming the contact point, a common molding compound is formed from end sections of the two conductors by melting the contact point from which at least a part of the screen is formed.

16. The method in accordance with claim 15, wherein the two conductors are melted at least partly for the manufacture of the contact point while forming a melt bead and in that at least a part of the screen is formed from the melt bead.

17. The method in accordance with claim 15, wherein the two conductors are melted together at least partly for the manufacture of the contact point while forming a melt bead and in that at least a part of the screen is formed from the melt bead.

18. A method of manufacturing a thermal element, having a shaft and having a measurement probe arranged at an end of the shaft, the method comprising:
    forming the thermal element that comprises a first conductor and a second conductor that are manufactured from different conductor materials and that are in electric contact with one another at a contact point provided in a region of the measurement probe,
    at least partially filling a tube that comprises the shaft with an adhesive;
    embedding the first conductor and the second conductor at least regionally embedded into a material of the shaft the adhesive;
    screening the contact point at least regionally by a screen the screen is formed from a screen material in addition to or as an alternative of the shaft material with respect to an outer space, the screen material has a lower coefficient of diffusion and/or a higher thermal conductivity than the shaft material;
    fastening the first conductor and the second conductor or the contact point are fastened to the screen in a thermally conductive manner; and
    wherein the two conductors are melted at least partly for the manufacture of the contact point while forming a melt bead and in that at least a part of the screen is formed from the melt bead.

19. The method in accordance with claim 18, wherein the first conductor and the second conductor or the contact point are welded onto the screen.

* * * * *